EXCITATION CIRCUITS FOR AN ARRAY OF ELECTRICAL ELEMENTS

Filed Oct. 13, 1965 11 Sheets-Sheet 1

INVENTORS
BERNARD J. LECHNER &
JURI TULTS
BY Samuel Cohen
Attorney

INVENTORS
BERNARD J. LECHNER &
JURI TULTS
BY Samuel Cohen
Attorney

INVENTORS
BERNARD J. LECHNER &
JURI TULTS
BY [signature]
Attorney

INVENTORS
BERNARD J. LECHNER &
JURI TULTS
BY [signature]
Attorney

EXCITATION CIRCUITS FOR AN ARRAY OF ELECTRICAL ELEMENTS

Filed Oct. 13, 1965

INVENTORS
BERNARD J. LECHNER &
JURI TULTS
BY [signature]
Attorney

EXCITATION CIRCUITS FOR AN ARRAY OF ELECTRICAL ELEMENTS

Filed Oct. 13, 1965 11 Sheets-Sheet 6

INVENTORS
BERNARD J. LECHNER &
JURI TULTS
BY Samuel Cohen
Attorney

INVENTORS
BERNARD J. LECHNER &
JURI TULTS
BY Samuel Cohen
Attorney

INVENTORS
BERNARD J. LECHNER &
JURI TULTS
BY Samuel Cohen
Attorney

INVENTORS
BERNARD J. LECHNER &
JURI TULTS
BY Samuel Cohen
Attorney

INVENTORS
BERNARD J. LECHNER &
JURI TULTS
BY
Attorney

EXCITATION CIRCUITS FOR AN ARRAY OF ELECTRICAL ELEMENTS

Filed Oct. 13, 1965

INVENTORS
BERNARD J. LECHNER &
JURI TULTS
BY Samuel Cohen
Attorney

United States Patent Office 3,393,346
Patented July 16, 1968

3,393,346
EXCITATION CIRCUITS FOR AN ARRAY OF ELECTRICAL ELEMENTS

Bernard J. Lechner and Juri Tults, Princeton, N.J., assignors to Radio Corporation of America, a corporation of Delaware Filed Oct. 13, 1965, Ser. No. 495,425
8 Claims. (Cl. 315—166)

ABSTRACT OF THE DISCLOSURE

Each phase of the power supply voltage employed to excite an array of elements has a period $T=t_a+t_e$, where during the period $t_a$, the value of the voltage is zero volts and during the period $t_e$, the voltage varies in amplitude between its peak values. During the period $t_a$ of a voltage applied to a row of elements, those elements may be addressed. Each alternating voltage is applied to a different plurality of groups of rows, each group of rows comprising $k$ adjacent rows spaced from a next group of that plurality of groups by $k(v-1)$ adjacent rows, where $v$ is the number of phases of the power supply voltage, $t_a \geqq kt_L$, and $t_L$ is the line period.

In certain forms of displays employing arrays of electrical elements, an element may be "selected" by applying time coincident selection signals to that element and the selected element may be excited by applying an alternating voltage thereto. In such displays it is often desirable to avoid interaction between the exciting voltage and the selection signals. This may be done by so phasing the selection signals with respect to the exciting alternating voltage that they occur when the exciting voltage is at or close to zero. This technique, however, has practical limitations when applied to larger arrays of elements because of the requirement for numerous delay lines or other phase adjusting circuits and the restrictions which become necessary in the selection signal and exciting voltage frequencies.

An alternative approach is to turn off the exciting voltage during the application of the selection signals. In the past, this has required a separate exciting voltage source for each line and means associated with each source for gating that source off during its line selection interval. Again, in cases of relatively large arrays, this is a disadvantage because of the need for a large number of exciting voltage sources.

The object of the present invention is to provide a greatly simplified arrangement for exciting an array of the type discussed above.

The circuit of the invention includes means for generating a first alternating voltage having a period $T=j/pn$, having an amplitude of zero volts during one portion $t_a \geqq k/pn$ of each alternating voltage period, and varying in amplitude between its peak values during the remaining interval $t_e$ of each period, where $n$ is the number of rows in an array, $p$ is the frame rate of the array in frames per second, and $j$ and $k$ are integers. The circuit also includes means for generating at least a second alternating voltage wave of similar shape to the first wave displaced in phase from the first wave. In many applications, only two alternating voltage sources are needed and in these applications these sources produce waves which are displaced in phase from one another by 180°. One of the alternating voltage generating means connects to groups of $k$ adjacent rows of the array spaced from one another by $k$ rows. The other means for generating an alternating voltage connects to the remaining rows of the array. In other applications the equivalent of three or more alternating voltage wave generators may be employed as is discussed in greater detail below.

The invention is discussed in greater detail below and is shown in the following drawings, of which:

Figure 5:
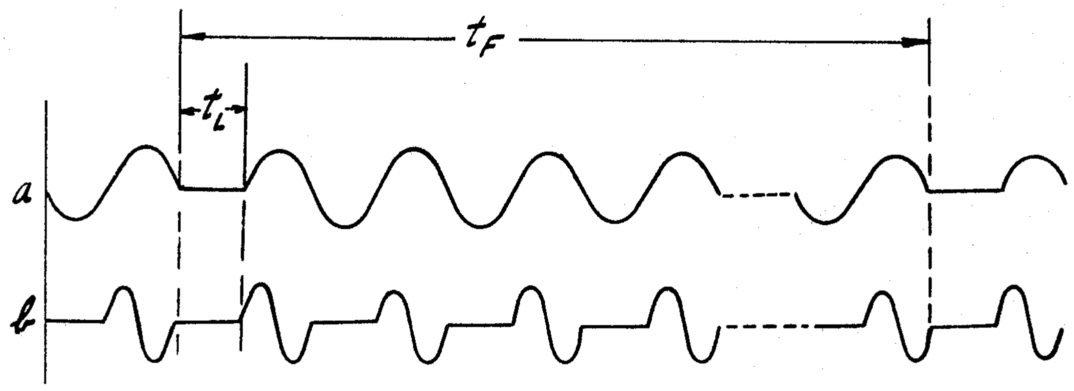
Figure 6:
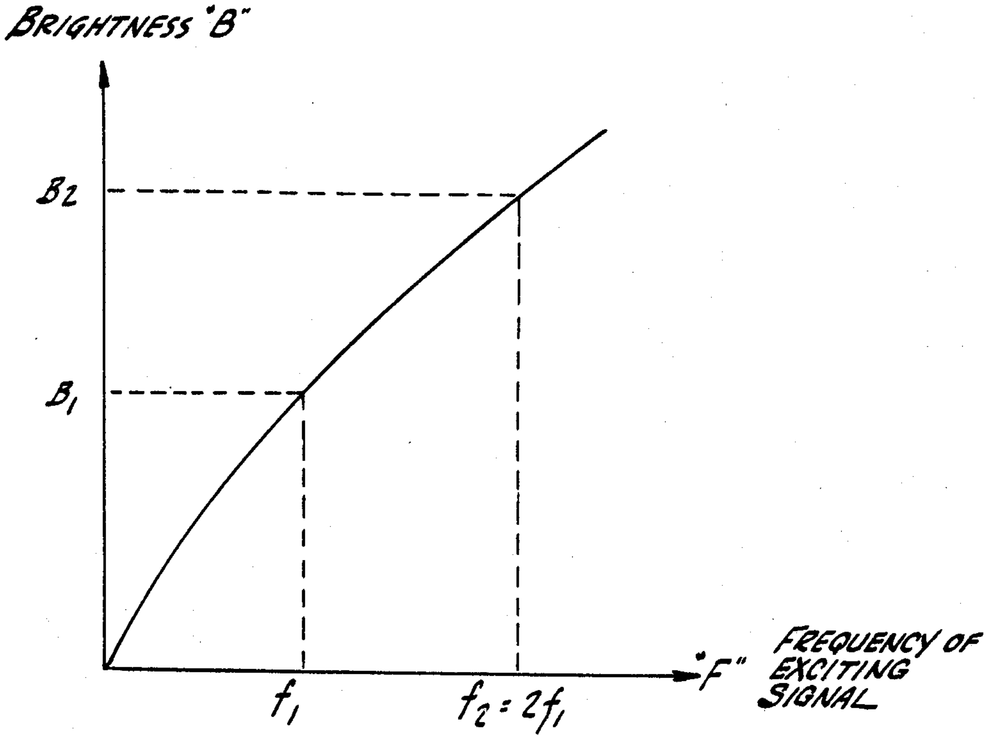
Figure 7:
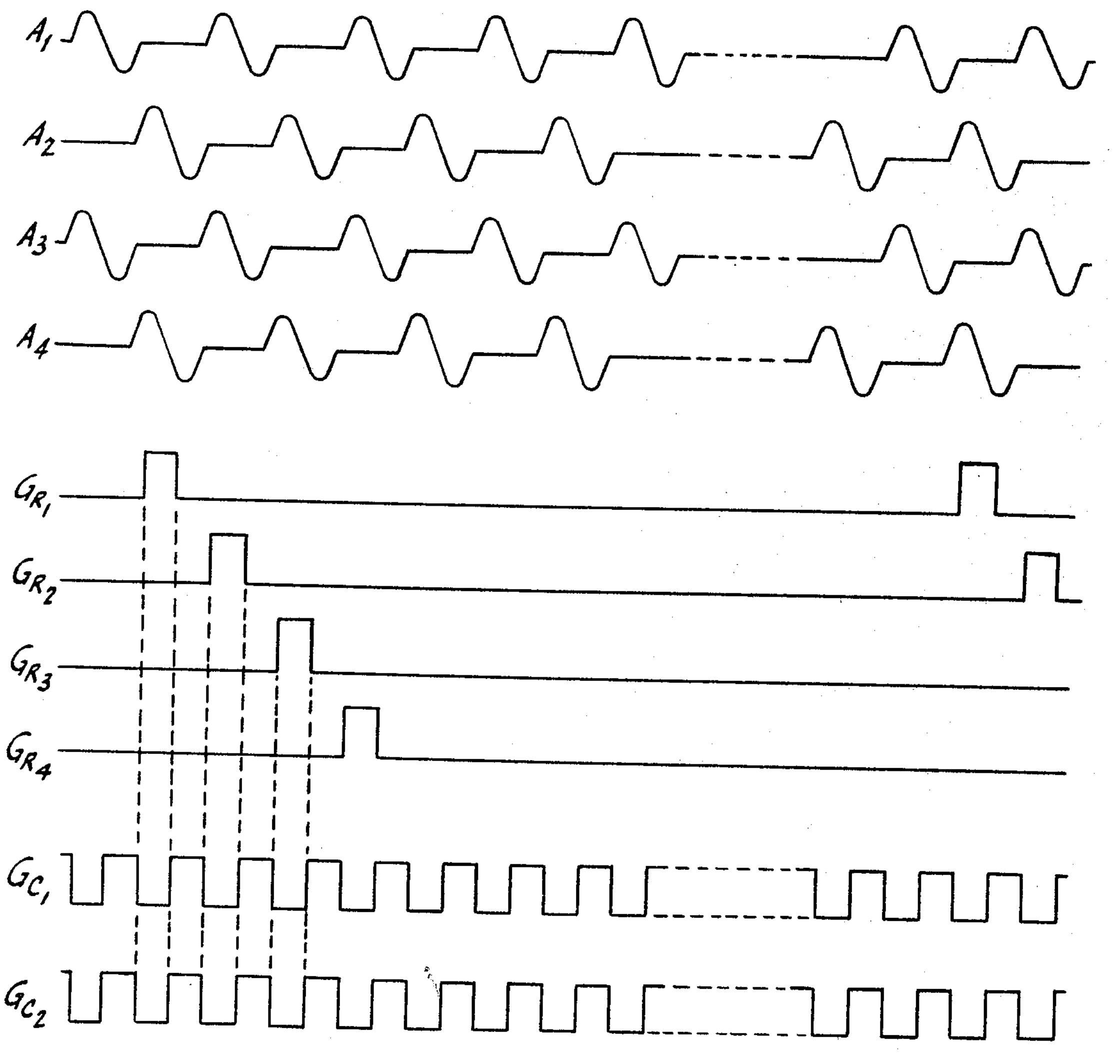
Figure 8:
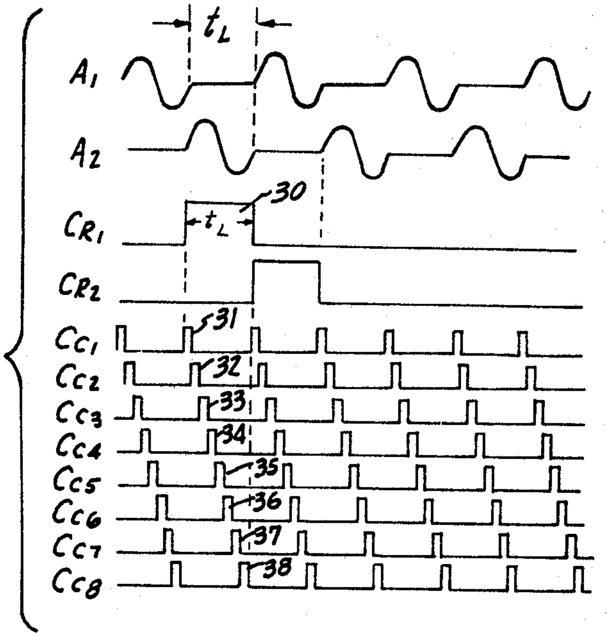
Figure 9:
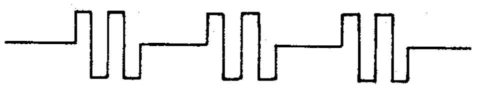
Figure 10:
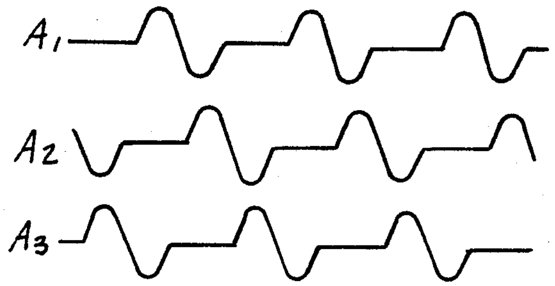
Figure 11:
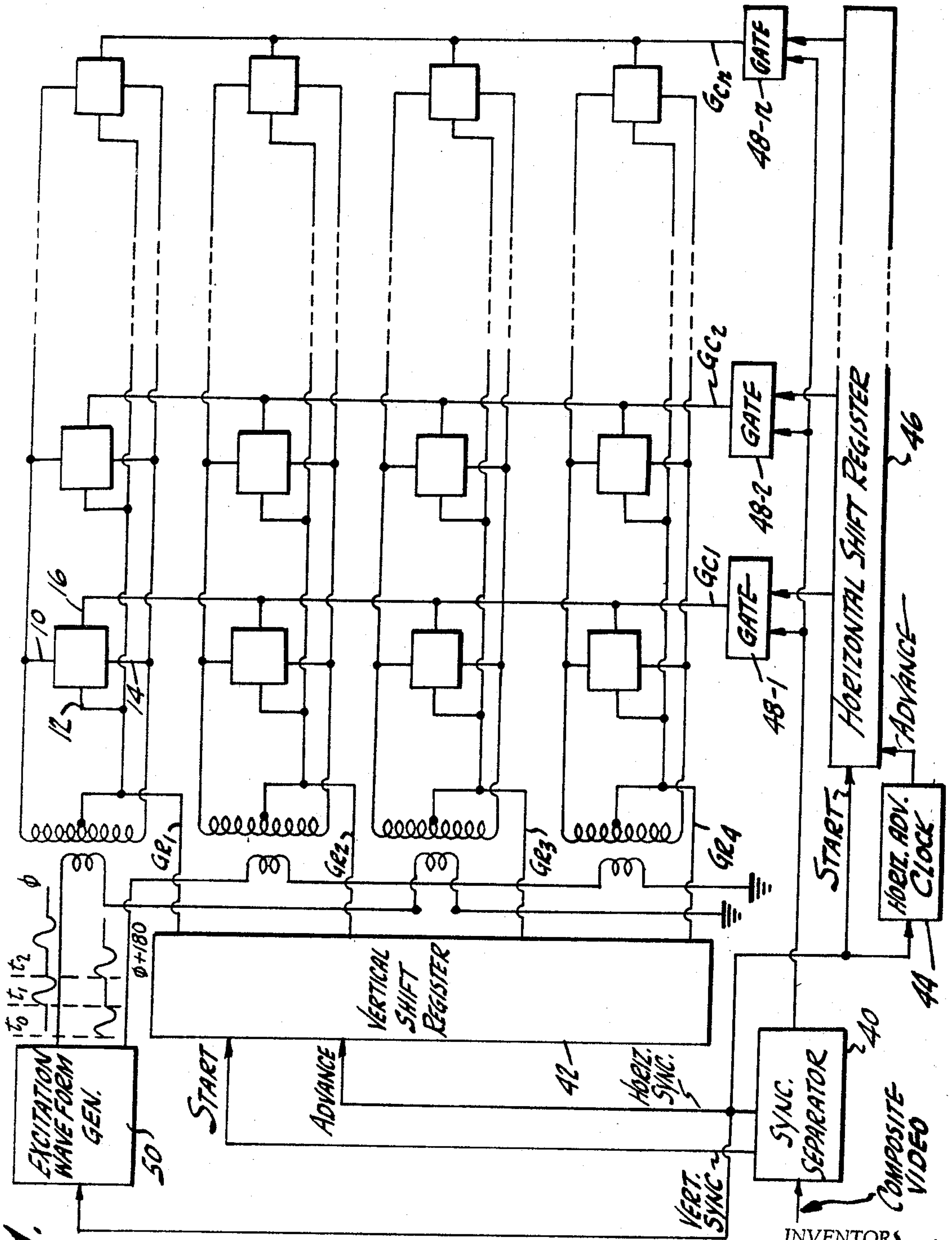
Figure 12:
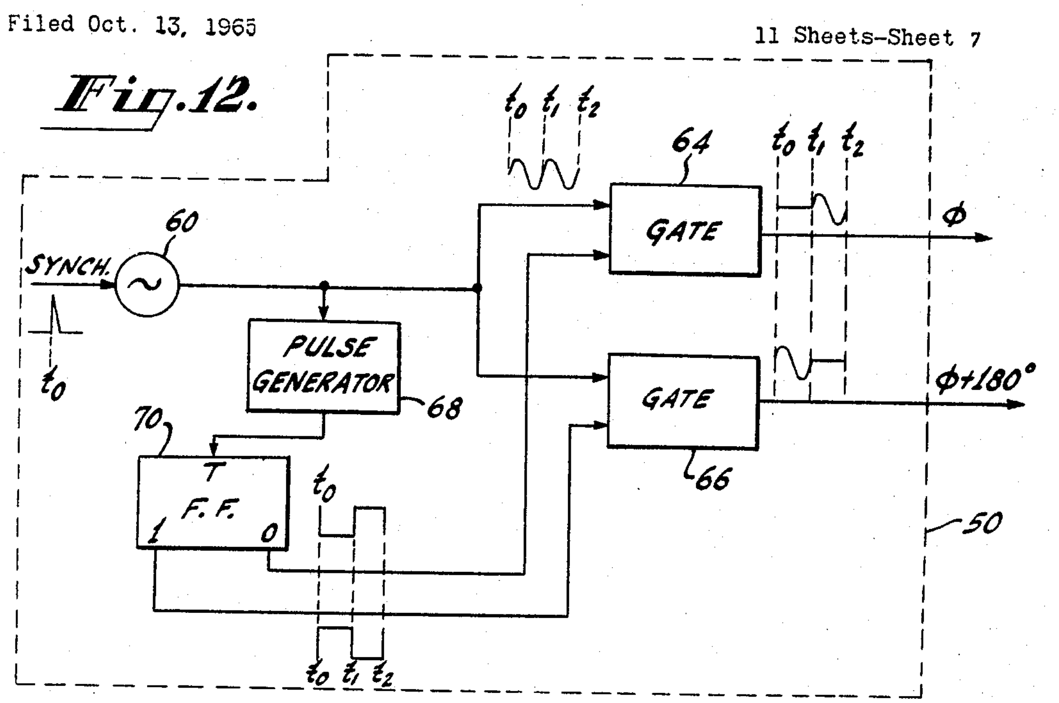
Figure 14:
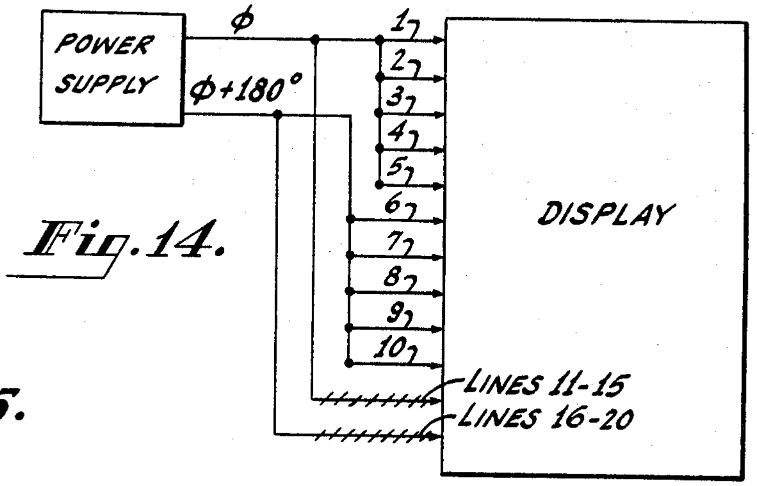
Figure 15:
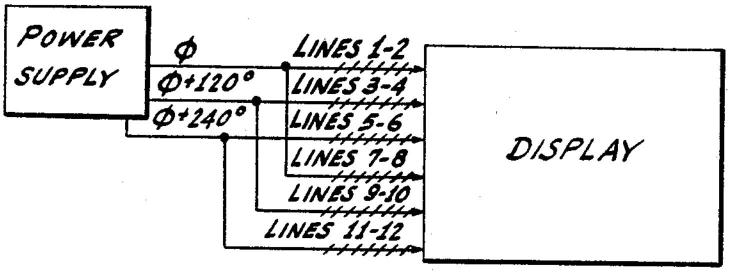
Figure 13:
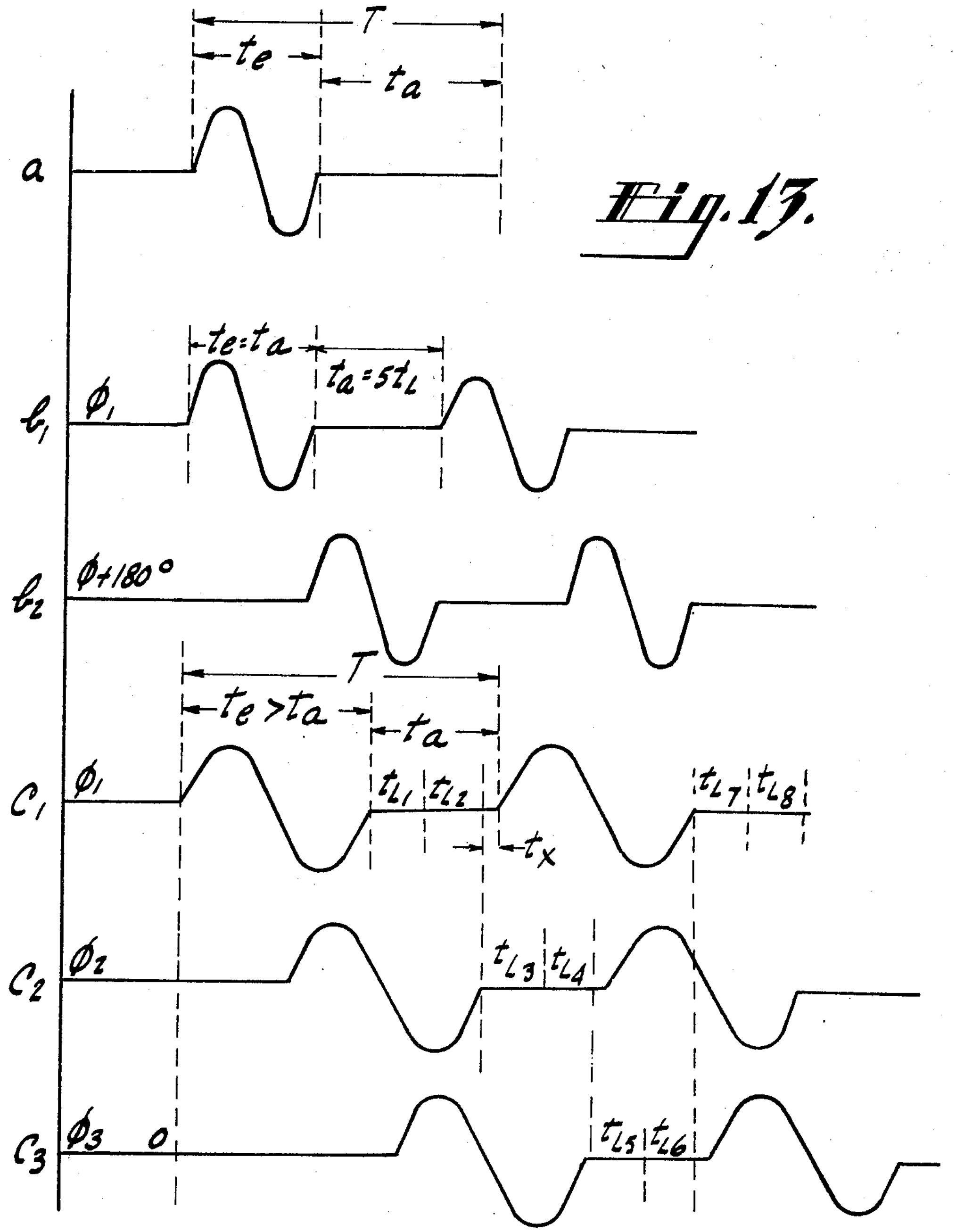
Figure 16:
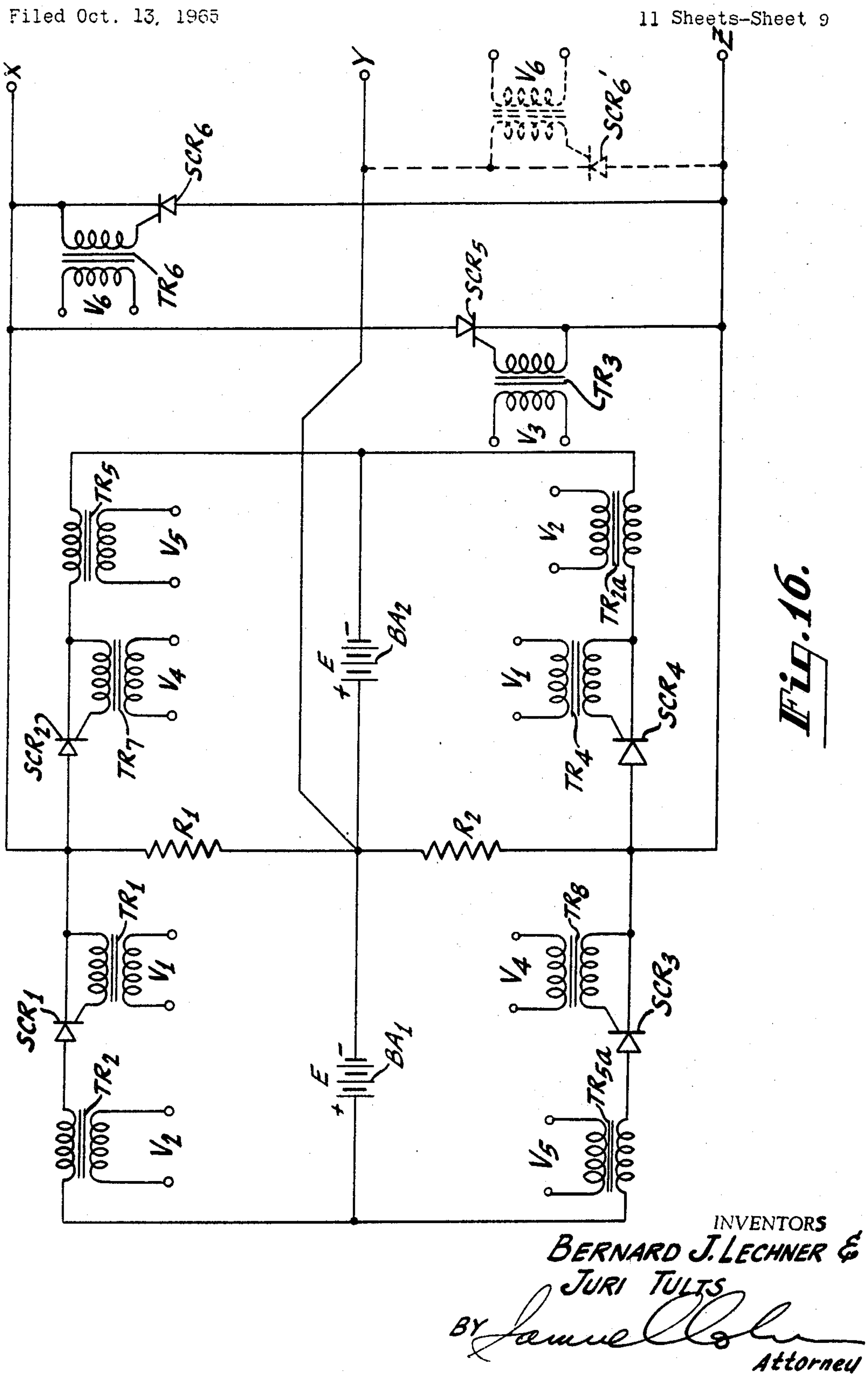
Figure 17:
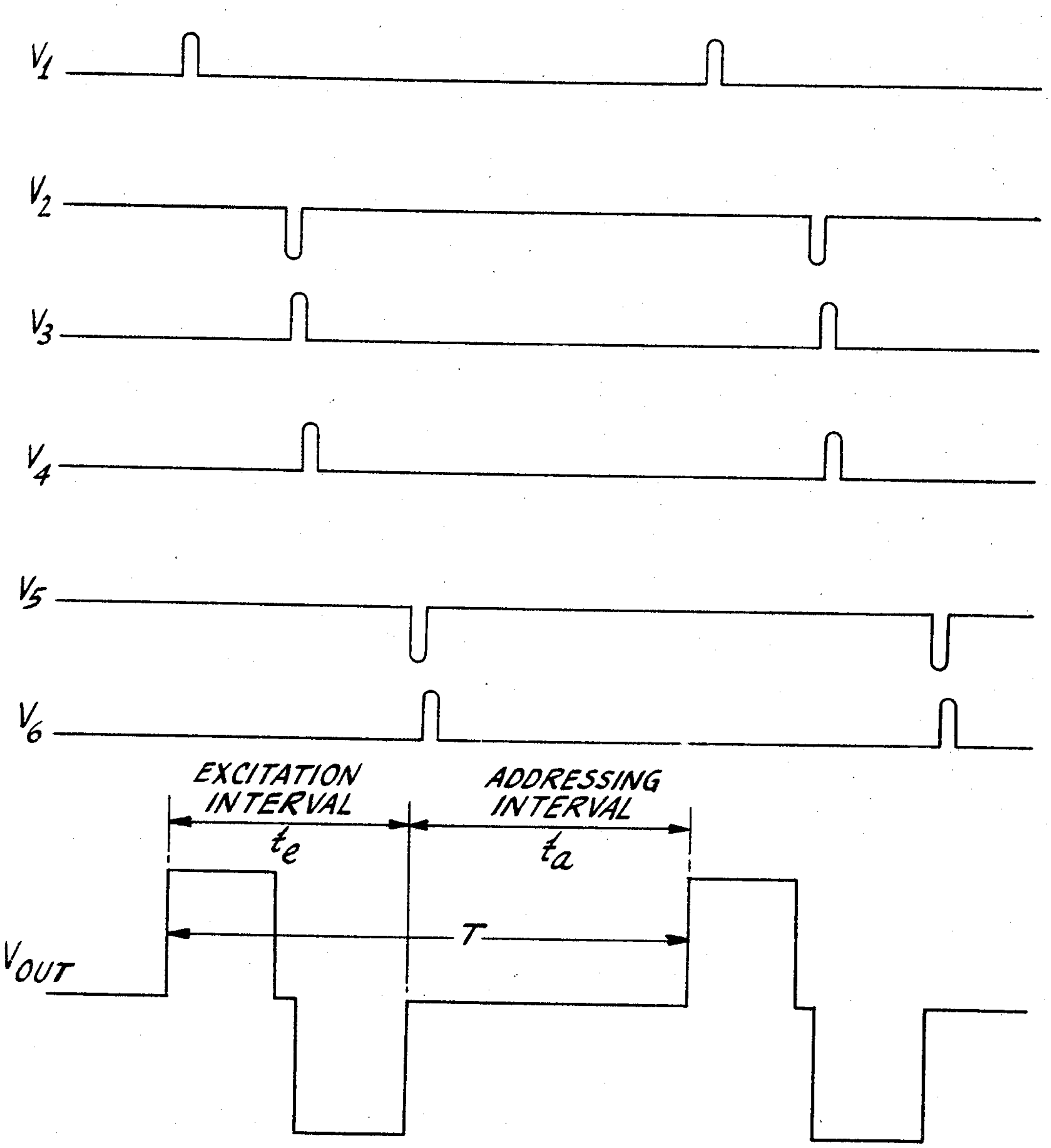
Figure 18:
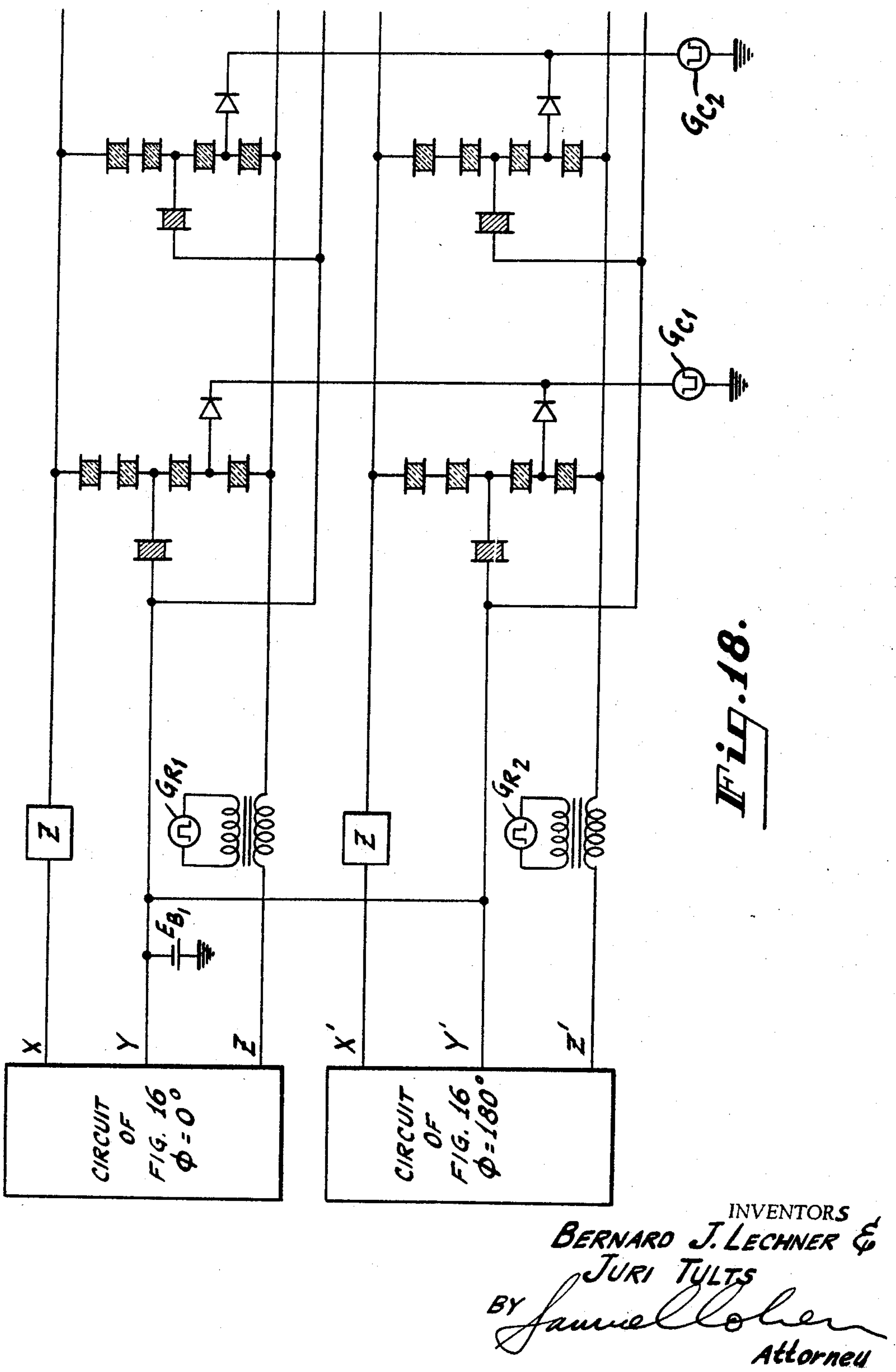

FIGURE 5 contrasts the waveform employed in the prior art with the one of the present invention;

FIGURE 6 is a graph of brightness versus frequency for an electroluminescent display element;

FIGURE 7 is another drawing of waveforms in accordance with the present invention;

FIGURES 8, 9 and 10 are other drawings of other waveforms which may be employed for the circuits of the invention;

FIGURE 11 is a block circuit diagram of a display panel in accordance with the invention;

FIGURE 12 is a block circuit diagram of one form of circuit for generating 180° out-of-phase voltages which may be employed in the circuit of FIGURE 11;

FIGURE 13 is a drawing of waveforms to help illustrate certain principles of the present invention;

FIGURES 14 and 15 are block circuit diagrams of various forms of the invention;

FIGURE 16 is a circuit diagram of a new and improved power supply for generating waveforms in accordance with the invention;

FIGURE 17 is a drawing of waveforms associated with the circuit of FIGURE 16; and FIGURE 18 is a block circuit diagram of a display operated in accordance with the principles of the invention.

Figure 1:
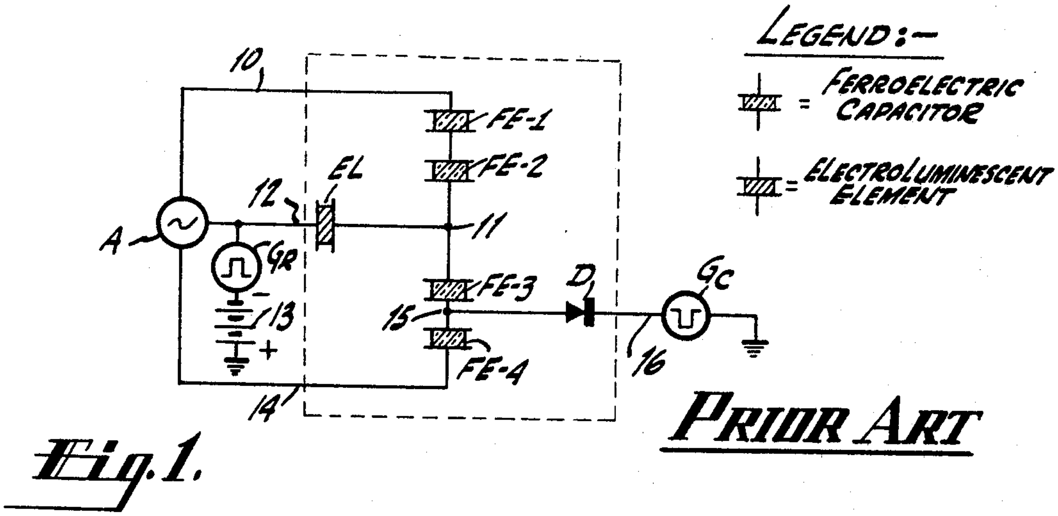
FIGURE 1 is a schematic circuit diagram of a prior art transcharger display circuit.

The so-called balanced transcharger of FIGURE 1 is discussed in detail in copending application, Ser. No. 409,096, filed Nov. 5, 1964, by B. J. Lechner and assigned to the same assignee as the present invention. The circuit includes four ferroelectric elements FE–1, FE–2, FE–3 and FE–4, all essentially in series with an alternating voltage source A. These elements form a bridge and an electroluminescent cell EL is connected between the source A and one apex 11 of the bridge. A row selection voltage pulse generator $G_r$ and a direct voltage source 13 are connected between ground and the lead 12 extending between the electroluminescent cell and the alternating voltage source A. A diode D and the column voltage pulse generator $G_c$ are connected between ground and the common connection 15 between ferroelectric elements FE–3 and FE–4.

In the operation of the circuit of FIGURE 1, the ferroelectric elements all initially may be polarized in the same direction. In other words, the transcharger circuits initially may be in their unblocked condition. In this condition, the bridge is balanced and essentially no alternating voltage develops between point 11 of the bridge and lead 12 of the bridge. The electroluminescent element therefore remains off. The direct voltage source, shown as battery 13, supplies a negative voltage to the diode maintaining the diode back biased. Accordingly, alternating voltage source A cannot spuriously cause one of the ferroelectric elements FE–3 and FE–4 to change its direction of polarization with respect to the other element.

The electroluminescent element EL may be selected by the coincident application of a positive voltage pulse by the row generator $G_R$ and a negative pulse by the column generator $G_c$. These two pulses are of sufficient amplitude to overcome the back-bias on the diode D and to switch the polarization of the ferroelectric element FE-3 with respect to the ferroelectric element FE-4. Accordingly, the portion FE-3, FE-4 of the bridge becomes blocked whereas the portion FE-1, FE-2 of the bridge remains unblocked. In this condition, a substantial alternating voltage develops across the electroluminescent element, a voltage of sufficient magnitude to cause it to light up.

As mentioned in the introductory portion of this application, it is preferable when operating the circuit of FIGURE 1 to lessen any possible interaction between the alternating voltage source A and the column and row pulses. This may be done by applying the column and row pulses during the time the alternating voltage supplied by source A is at or close to zero. As an alternative, the alternating voltage source A may be turned off during the time that the column and row pulses are applied. The circuit for doing this is relatively straightforward and may include, for example, a gate through which the sinusoidal wave produced by the source A is applied. The gate may be turned off during the row or line interval.

Figure 2:
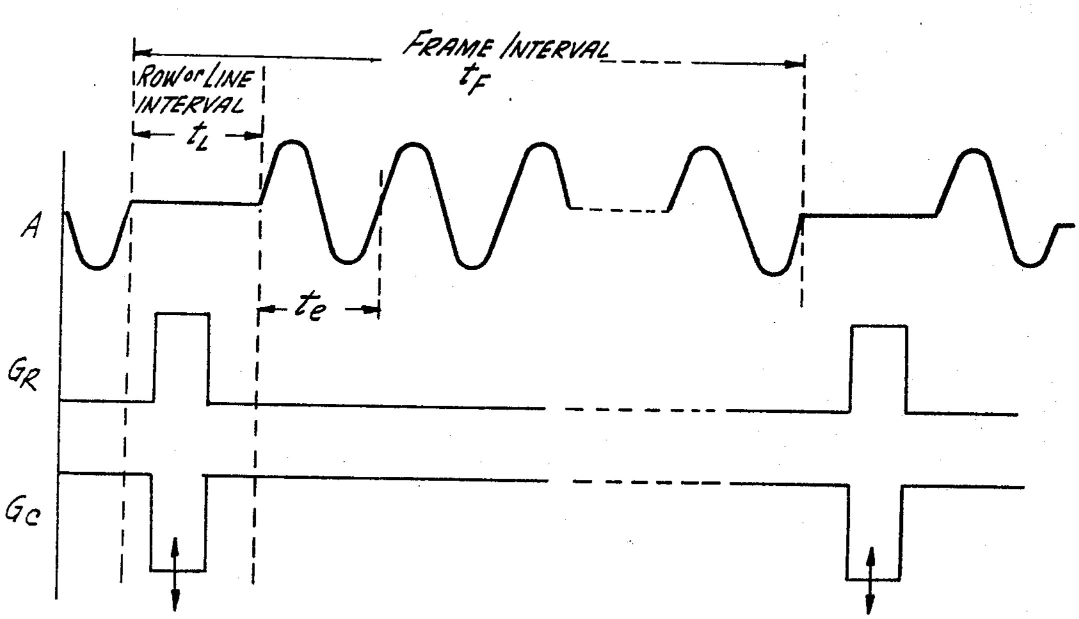
FIGURE 2 shows waveforms present in the circuit of FIGURE 1.

An appropriately gated sine wave for the circuit of FIGURE 1 is shown at A in FIGURE 2. The row or line interval is $t_L$, the frame interval it $t_F$ and the period of the sine wave is $t_e$. In a typical television display having 500 lines and operating at 30 frames per second, $t_F$ may be 33 milliseconds and $t_L$ 67 microseconds. A typical excitation frequency is 1 kilocycle and at this frequency $t_e$ is 1,000 microseconds. These various periods are not drawn to scale in this figure or in the remaining figures.

Figure 3:
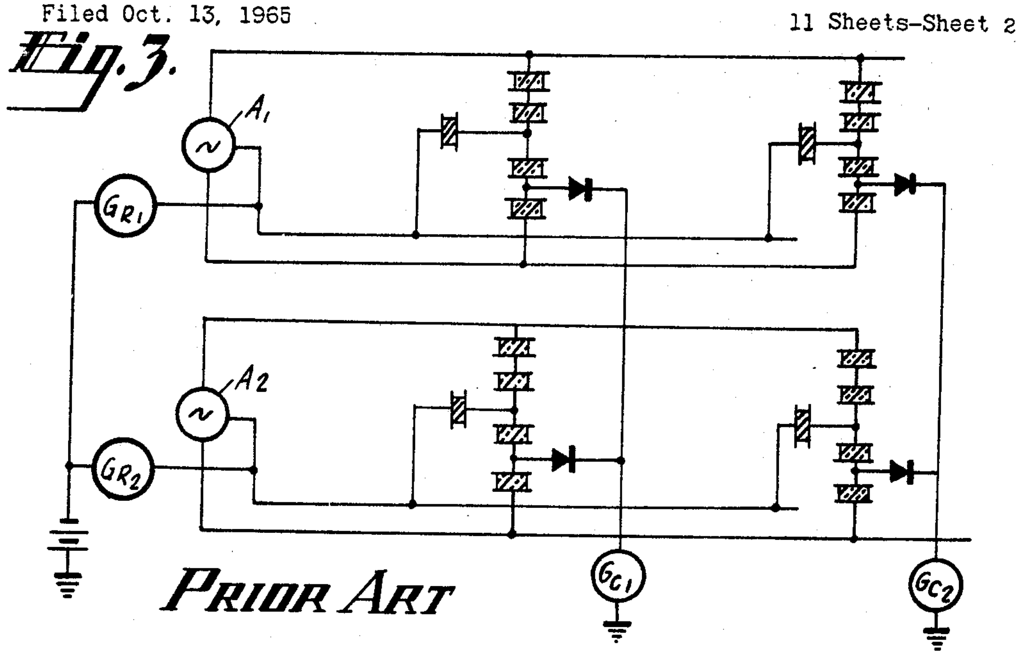
FIGURE 3 is a schematic circuit diagram of an array of elements such as shown in FIGURE 1. Two rows and two columns of the array are illustrated.

If desired to use the technique discussed above for avoiding interaction between the exciting source A and the column and row selection pulses, a panel may be built such as shown in FIGURE 3. In this panel there is a separate exciting voltage source, shown at $A_1$ and $A_2$, respectively, for each line. Each such source, in the case of sinusoidal wave excitation, employs an output gate and the gates for the successive lines are turned off during the successive line intervals. The various waveforms involved are shown in FIGURE 4.

Figure 4:
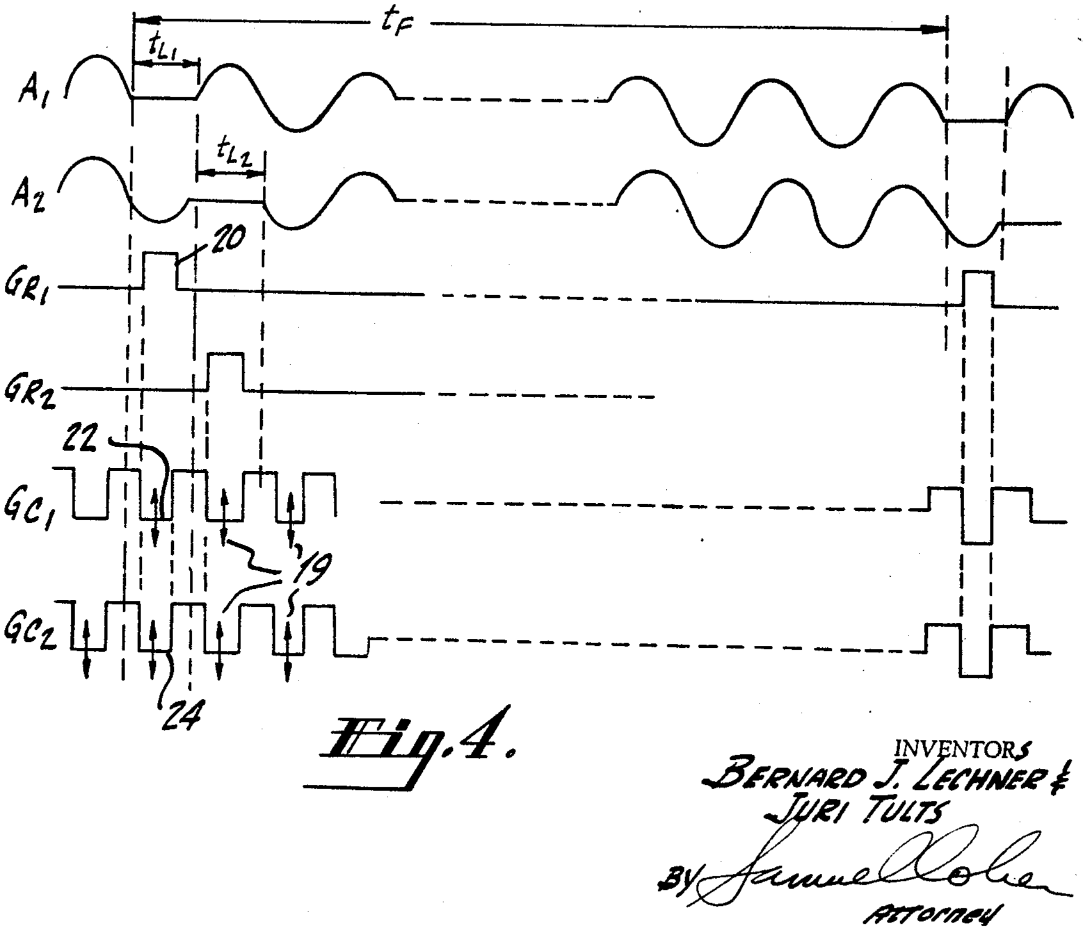
FIGURE 4 shows waveforms present in the circuit of FIGURE 3.

"Line at a time" addressing is assumed in the waveforms of FIGURE 4. It might also be mentioned that while the column pulses are shown to be of fixed amplitude in FIGURE 4 (and in other of the figures) they are, in fact, amplitude modulated in accordance with the information to be displayed, as indicated schematically by the arrows 19. Although only two rows are shown in FIGURE 3, the column pulses shown in FIGURE 4 are suitable for application to more than two rows.

In the operation depicted in FIGURE 4, during the interval $t_{L_1}$, the alternating voltage source $A_1$ is turned off, the row pulse 20 is applied, and the column signals 22 and 24 are also applied. A column signal, when of maximum amplitude, substantially fully blocks the transcharger circuit to which it is applied and correspondingly fully unbalances the bridge of which the transcharger circuit is a part. This causes the electroluminescent element of the bridge to later light up at full intensity. When the column signal is of lower amplitude, it causes only partial blocking of the ferroelectric element to which it is applied and a lighting of an electroluminescent element, at a later time, at a lower intensity.

After the interval $t_{L_1}$, the source $A_1$ is essentially turned on again and the electroluminescent elements in the first line light up at an intensity corresponding to the amplitudes of the column signals applied to the successive elements.

In a manner similar to the above, during the interval $t_{L_2}$ of the second line, source $A_2$ is turned off and the row and column selection signals are applied. These affect the ferroelectric elements to which they are applied in an amount depending upon the amplitude of the column pulses. After the interval $t_{L_2}$, the source $A_2$ is turned on again to cause the electroluminescent elements in row two to light up.

FIGURE *5a* shows again the exciting waveform employed in the prior art. FIGURE *5b* shows the exciting waveform employed in the present invention. The waveform of FIGURE *5b* is shown to be gated off one-half of the time, for purposes of the present illustration, and is also shown to have the same number of alternations in the frame time $t_F$ as the wave of FIGURE *5a*, again by way of example.

An important feature of the invention is that the circuit performance is substantially identical for each of the waveforms of FIGURE 5. Specifically, the brightness and life of the electroluminescent cell are little different regardless of whether the waveform of FIGURES *5a* or *5b* is employed. The reason for the same brightness can be seen by referring to FIGURE 6 which shows the brightness of the electroluminescent cell as a function of the frequency of the exciting signal. It can be seen from FIGURE 6 that the brightness increases with increasing frequency and if, for example, the waveform of FIGURE 5a has a frequency $f_1$ the brightness will be $B_1$. The frequency of the waveform of FIGURE *5b* is $f_2$ which is equal to two times $f_1$. This results in a brightness $B_2$ which is nearly twice as great as $B_1$. However, the waveform of FIGURE *5b* is present for only half of the time and therefore the average brightness is only one-half of $B_2$. This, however, is very nearly equal to $B_1$ because of the shape of the brightness-frequency characteristic. Therefore, the waveforms of FIGURES *5a* and *5b* will produce very nearly the same brightness.

With respect to the second point above, as is well-known, the life of an electroluminescent cell is dependent primarily on the total number of voltage alternations which it receives and not on the rate at which they are applied or the period over which they are applied. Therefore, since the waveforms of FIGURES *5a* and *5b* subject the electroluminescent cell to the same total number of alternations, the life of the cell will be comparable in both cases.

FIGURE 7 shows how the waveform of FIGURE *5b* is applied to a 4 x 2 (4 rows, 2 columns) matrix of the same general type as shown in FIGURE 2. The row waveforms $G_{R_1}$–$G_{R_4}$ and the column waveforms $G_{c_1}$–$G_{c_2}$ are similar to the corresponding waveforms of FIGURE 4. The waveforms $A_1$–$A_4$ are, however, different. They correspond to the waveform of FIGURE *5b* with the waveform $A_1$ identical to the waveform $A_3$ and 180° out-of-phase with the waveforms $A_2$ and $A_4$. It is clear from FIGURE 7 that one source may be employed for the waveforms $A_1$ and $A_3$ and a second source or its equivalent for the waveforms $A_2$ and $A_4$.

FIGURE 7 shows the waveforms for a display which is addressed a line at a time. However, the excitation waveform arrangement of the invention can also be used for a display addressed a bit at a time. The required waveforms for a matrix display having two rows of eight elements each are shown in FIGURE 8.

During the interval $t_L$ of the row 1 pulse 30, the column pulses 31–38 occur in sequence. These column pulses select the elements in row 1, one at a time. After the termination of the row pulse 30, the successive alternations of the energizing voltage source $A_1$ cause the electroluminescent elements in row one to be turned on at an amplitude corresponding to the amplitudes of the successive column pulses 31–38. As in the other figures, the column pulses are shown to be of the same amplitude, however, in practice they are of an amplitude corresponding to the video or other modulating signal indicative of the information to be displayed.

Although a single sinewave cycle has been shown between gating intervals, the invention is, of course, not limited to this specific arrangement. For example, square or other types of alternating waves may be used rather than sine waves and more than one cycle may be employed between the gating periods, that is, between the periods at which the wave is at zero volts. FIGURE 9 shows a type of exciting wave in which the voltage is a square wave voltage and in which two cycles occur between each pair of gating intervals.

In the embodiments of the invention discussed so far, only two phases of exciting waves are employed. It is to be understood that three or more phases may be used instead. A three-phase exciting wave is shown in FIGURE 10. The successive phases are spaced 120° apart. The first wave $A_1$ is applied to rows 1, 4, 7, 10 and so on; the second phase $A_2$ is applied to rows 2, 5, 8, 11 and so on; the third phase $A_3$ is applied to rows 3, 6, 9, 12 and so on.

FIGURE 11 is a block circuit diagram of a slow-scan television matrix display according to the invention in which the elements are selected one at a time. The system includes a sync separator 40 which receives the composite video signal. Its horizontal and vertical synchronization signal outputs are applied to a vertical shift register 42 and its horizontal synchronization signals are applied to a horizontal advance clock generator 44 and to a horizontal shift register 46. The video signals produced by the sync separator 44 are applied to gates **48–*l* through 48–*n***.

The horizontal synchronization signal produced by the sync separator 40 is also applied to an excitation waveform generator 50 such as shown in FIGURE 12. Referring briefly to this figure, sinewave source 60 supplies its output to gates 64 and 66. It also supplies a triggering signal, via pulse generator 68, to the trigger terminal of triggerable flip-flop 70. The pulse generator produces one pulse per cycle of sinewave. The 1 and 0 outputs of the flip-flop serve as enabling signals for the respective gates 64 and 66 to which they are applied. The waveforms present at the various leads are shown in the drawing. As shown in FIGURE 11, the wave $\phi$ is applied to lines 1 and 3 and the wave $\phi+180°$ is applied to lines 2 and 4.

The matrix of FIGURE 11 consists of a plurality of circuits such as shown in FIGURE 1. To demonstrate how the input leads of each element correspond to the leads of the balanced bridge circuit of FIGURE 1, similar reference numerals have been applied to the leads of FIGURES 1 and 11.

In the operation of the circuit of FIGURE 11, the composite video input signal is separated into video and synchronizing signals in well-known fashion by the synchronization separator 40. The vertical synchronizing signal is used to synchronize the start of the vertical shift register. In other words, in response to the first vertical synchronization signal, the first stage of the shift register is energized and it produces the row selection signal $G_{r_1}$. The horizontal synchronizing signal, which is applied to the advance terminal of the vertical shift register, advances the vertical shift register by one step each time the horizontal synchronizing signal occurs. In other words, after one line interval, that is, after all of the elements in the first row have been addressed, the horizontal synchronization signal occurs and this causes the row signal $G_{r_1}$ to disappear and the row signal $G_{r_2}$ to occur.

The horizontal synchronization signal is also used to synchronize the start of the horizontal shift register. This register is advanced at a rate determined by the horizontal advance clock frequency. The latter is started by the horizontal synchronization pulse but operates at a frequency $n$ times as great, where $n$ is the number of elements in each horizontal line (row) of the display. Thus, the horizontal shift register applies priming pulses to the gates **48–*l* through 48–*n*, in succession, during the interval $t_L$ (see FIG. 8) of a row pulse such as $G_{r_1}$ or $G_{r_2}$ and so on. The second input to each gate is the video signal supplied by the synchronization separator 40**. Therefore, the outputs of the gates are amplitude modulated signals corresponding to $G_{c_1}$ through $G_{c_n}$, similar to the column selection signals shown in FIGURE 8.

In the discussion up to this point, for purposes of illustration, it has been assumed that the "off" interval (see FIG. 13*a*) of the applied excitation wave is equal to the line interval $t_L$. Under these conditions, phase 1 of the power supply wave is applied to lines 1, 3, 5, 7 of the matrix and so on and phase 2 of the power supply wave is applied to the remaining lines 2, 4, 6 and so on. In many applications this is a very useful arrangement. For example, in the slow-scan television system of FIGURE 11, if there are 50 elements per line and 500 lines per frame, and if T, the period of the power supply wave is 1000 microseconds, then $t_a=500$ microseconds$=t_L$. The frame period $t_f=500$ lines per frame$\times500$ microseconds per line$=1/4$ second per frame. The frame rate therefore is 4 frames per second. The time available for addressing each element is $$\frac{500\ \mu\ \text{sec./line}}{50\ \text{elements/line}}=10\ \mu\ \text{sec./element}$$

Relationships other than the above among $t_a$, $t_e$ and $t_L$ are possible and, in many cases, desirable. The period $t_e$ should be chosen so that the frequency of the alternating signal can be made compatible with the electroluminescent cell performance. In other words, the frequency of the applied signal should be within the range at which the efficiency of the electroluminescent cell (the percentage of received electrical power it converts to light) is relatively high. The period $t_e$ may have one cycle of a signal, as shown in FIGURE 13, or several cycles as shown in FIGURE 9. In either case, the signal may be of sinusoidal or other shape. The period $t_a$ should be chosen so that it is equal to or greater than $t_L$. The period $T=t_a+t_e$ must equal $jt_L$, where $j$ is an integer.

It has already been shown that if $t_a=t_L$ and $t_a=t_e$ then phase 1 of the power supply voltage feeds odd alternate lines and the other phase even alternate lines. As a general rule, if $t_a$ is greater than $t_L$ and in fact is equal to $kt_L$, where $k$ is an integer, then one power supply feeds lines 1, 2, 3 . . . $k$ and $2k+1$, $2k+2$ . . . , $3k$, and $4k+1$, $4k+2$ . . . $4k$, and so on and the other phase of the power supply voltage feeds lines $k+1$, $k+2$ . . . $2k$, and $3k+1$, $3k+2$ . . . $4k$, and $5k+1$, $5k+2$ . . . $6k$ and so on.

The period $t_a$ may be equal to $t_e$ or may be unequal to $t_e$. If $t_a\neq t_e$ then:

(1) If $t_a<t_e$, the power supply voltage should have three or more phases. This is illustrated in Example II below. Calculations for the number of line periods $t_L$ per period $t_a$ are similar to those given above.

(2) If $t_a>t_e$, it may be assumed that $t_a=T/2$ and the rules followed are the same as those given above.

The various rules above may be illustrated by a number of specific examples. In the first Example I, $t_a>t_L$. The specific values chosen are close to those employed for commercial television. To simplify the arithmetic, however, minor changes have been made which do not affect the principles meant to be illustrated. The numbers are: Frame rate $f_f=20$ frames per second; number of lines $n=500$; number of elements per line $m=700$; $t_L=1/f_fn=100$ microseconds. T is chosen to be 1000 microseconds as this period is compatible with the required excitation frequency for the electroluminescent cell, and is equal to $jt_L$, where $j=10$. $t_a$ is chosen to be equal to $t_e=500$ microseconds.

As should be clear from the figures above, phase 1 of the power supply wave is connected to lines 1–5, 11–15, 21–25, and so on and the second phase of the power supply voltage is connected to lines 6–10, 16–20, 26–30 and so on. This type of operation is possible as the 500 microsecond "off" interval is sufficiently long that the elements in 5 lines can be addressed (only 100 microseconds per line is required). As there are 700 elements, the period employed for addressing each element, assuming element at a time selection is 0.14 microsecond.

The waveforms above are illustrated in FIGURE 13 at $b_1$ and $b_2$. The corresponding circuit is illustrated schematically in FIGURE 14. The display of FIGURE 14 may be similar to the one of FIGURE 11. The connection between the power supply and the various lines may be via transformer coupling, analogously to what is shown in FIGURE 11.

As a practical matter, present transcharger circuits are relatively slow so that in the particular example given above line at a time addressing is preferred. When addressed a line at a time, 100 microseconds is available for switching the elements of the line, with the numbers given.

In the next example, Example II, $t_a < t_e$. The numbers are: $f_f = 100$ cycles per second; $n = 60$; $m = 75$;

$$t_L = 1/f_f n = 167 \text{ microseconds}$$

T is again chosen to be 1000 microseconds, however, the "off" interval $t_a$ is chosen to be 400 microseconds, which is slightly more than double $t_L$, and $t_e$ is therefore 600 microseconds.

In this example, as $t_a$ is less than $t_e$, more than two phases of an applied voltage are used. The period $T = 1000$ microseconds is exactly $6t_L$. Accordingly, if phase 1 is made to feed lines 1–2, 7–8, 13–14, and so on, phase 2 to feed lines 3–4, 9–10, 15–16 and so on, and phase 3 to feed lines 5–6, 11–12, 16–17 and so on, proper operation will result.

The various waveforms involved for this example are shown in FIGURE 13 at $c_1$, $c_2$ and $c_3$. During the interval $t_a$ in which the power supply voltage applied to lines 1 and 2 is zero volts, lines 1 and 2 may be addressed. This is indicated by the symbols $t_{L_1}$ and $t_{L_2}$ in the waveform $c_1$. The "off" interval for lines 3 and 4 begins immediately after the period $t_{L_2}$ as is shown at $c_2$. The small interval $t_x$ before the power supply for lines 1 and 2 is turned on again is desirable as it occurs close to the time the sine wave abruptly starts. In this region, the wave is slightly rounded (the voltage is not absolutely at zero volts). For this same reason, it is sometimes desirable to split up $t_x$ to two regions each $\frac{1}{2}t_x$ in duration, one occurring immediately before $t_{L_1}$ and the other immediately after $t_{L_2}$.

Lines 5 and 6 are turned off, that is, the power supply voltage reduces to zero volts, during the fifth and sixth periods $t_{L_5}$ and $t_{L_6}$ as shown at $c_3$. During the 7th and 8th periods, lines 7 and 8 and 1 and 2 are turned off again, as is shown at $c_1$.

A display operating in accordance with Example II is shown schematically in FIGURE 15. The operation of the display should be clear from the discussion above.

In the third example, Example III, $t_a > t_e$. The numbers are: $f_f = 50$ frames per second; $n = 400$; $m = 600$. Therefore $t_L = 50$ microseconds. $j$ in this example is chosen to be 6 so that $T = 300$ microseconds. The period $t_a$ is chosen to be 200 microseconds so that $t_e = 100$ microseconds. The frequency of 10 kilocycles associated with the period $t_e$ of 100 microseconds is suitable for application to the electroluminescent elements of the display. With this arrangement, phase 1 may be connected to lines 1–3, 7–9, 13–15 and so on and phase 2 may be connected to lines 4–6, 10–12, 16–18 and so on. With this arrangement, the period $t_x$ is 50 microseconds. As in the previous example, this is an advantage. In other respects, the operation of the invention using these figures is self-evident from what has already been discussed.

The waveforms shown in FIGURE 13 and in a number of other figures are interrupted sine waves. However, as mentioned previously, here and in other of the circuits of the present application, square waves may be used instead. An improved circuit for generating an interrupted square wave appears in FIGURE 16. The circuit includes silicon controlled rectifiers $SCR_1$–$SCR_6$. They are connected through various transformers to a power supply, shown as two batteries $BA_1$ and $BA_2$. Both batteries produce a voltage of the same value E. The silicon rectifiers are turned on and off by voltage pulses $V_1$–$V_6$ in the manner discussed below. These voltage pulses, their relative polarities, and their time relation are shown in FIGURE 17. The output wave produced between terminals X and Z is also shown in FIGURE 17.

In the operation of the circuit of FIGURE 16, the silicon controlled rectifiers are initially off. In this condition, the voltages at the 3 output terminals X, Y and Z are all zero volts. While not essential, for purposes of the present explanation, it may be assumed that the center terminal Y is at ground.

The interrupted square wave may be initiated by applying a voltage pulse $V_1$ to the primary windings of transformers $TR_1$ and $TR_4$. This turns on the silicon controlled rectifiers $SCR_1$ and $SCR_4$. Now terminal X goes positive to the voltage +E because of the low impedance path which is present between the positive terminal of battery $BA_1$ through rectifier $SCR_1$ to terminal X. In a similar manner, terminal Z attains a voltage level −E in view of the low impedance path present from the negative terminal of battery $BA_2$ through the rectifier $SCR_4$ to terminal Z.

After an interval equal to that of the duration desired for one portion of the square wave, the trigger voltage $V_2$ is applied to transformers $TR_2$ and $TR_{2a}$, respectively, and immediately thereafter the trigger voltage $V_3$ is applied to transformer $TR_3$. The trigger voltage $V_2$ turns off the rectifiers $SCR_1$ and $SCR_4$. The trigger voltage $V_3$ turns on the rectifier $SCR_5$ which short circuits the load to bring the output voltage rapidly to zero. When the load voltage reaches zero, that is, when the difference of potential between terminals X and Z reaches zero, the rectifier $SCR_5$ automatically turns off.

Trigger voltage $V_4$ occurs slightly after the rectifier $SCR_5$ is turned off. This trigger voltage, $V_4$, is applied to transformers $TR_8$ and $TR_7$ turning on rectifiers $SCR_3$ and $SCR_2$, respectively. Low impedance paths through these rectifiers now exist from the negative terminal of battery $BA_2$ to the output terminal X and from the positive terminal of battery $BA_1$ to output terminal Z. Accordingly, the square wave output goes negative at terminal X and positive at terminal Z, assuming terminal Y to be at ground.

After a given interval, trigger voltage $V_5$ is applied to transformers $TR_5$ and $TR_{5a}$ to turn off the rectifiers $SCR_2$ and $SCR_3$. Slightly later, the voltage pulse $V_6$ is applied to transformer $TR_6$ to turn on rectifier $SCR_6$ and to thereby bring the output voltage rapidly to zero. Rectifier $SCR_6$ automatically turns off when the load voltage reaches zero.

FIGURE 18 shows a display using the power supply of FIGURE 16. For purposes of drawing simplicity, only two rows and two columns are shown. The circuit of FIGURE 16 connects to one row. A second circuit such as the one shown in FIGURE 16, but which is triggered to produce an output 180° out-of-phase with the one produced at X, Y and Z connects to the second row of the display. It is to be understood, of course, that in a practical display having more rows, one power supply connects to the odd rows 1, 3, 5 and so on and the other power supply connects to the even rows 2, 4, 6 and so on. It is also to be understood that while, for purposes of the present explanation, the addressing interval $t_a$ is assumed to be equal to the line interval $t_L$, this need not necessarily be the case. If it is not, then the display may be connected in the manner already discussed in detail previously.

The operation of the circuit of FIGURE 18 is quite analogous to that of the circuits which have already been discussed. However, a few points are worth mentioning. A direct voltage source, shown as battery $E_{B_1}$ is common to the entire display. It provides the reverse bias for the diodes of the transcharger circuits. Accordingly, terminal Y is not connected directly to ground, but is instead connected through this battery to ground. The impedance elements Z are included in the upper row buses to match the impedance of the row pulse transformers and thus keep the transcharger bridge circuit balanced.

A number of elements in FIGURE 16 have not yet been discussed. The resistor $R_2$ is employed to provide a low resistance return path for the column and row signals of FIGURE 17 and the resistor $R_1$ is included for the symmetry. These resistors, which should be low in value to eliminate cross-talk between rows, somewhat reduce the efficiency of the excitation source. They may be eliminated by including a non-linear element such as $SCR_{6'}$, shown in phantom view in FIGURE 16 between terminals Y and Z. The rectifier $SCR_6$, is maintained in the on state during the addressing interval to provide a return path and in the off state during the excitation interval.

In the various examples of the invention discussed thus far $j/k=v$ where $j$ and $k$ are integers and $v$ is an integer and is equal to the number of phases of power supply required. These power supply phases are displaced from each other by substantially 360°/$v$. It is possible, however, to choose $j$ and $k$ such that $j/k$ is not equal to an integer. In this case, $v$ power supply phases are employed, where $v>j/k$. For example, if $j=10$ and $k=4$, $v$ is 3 or more. Suppose $v=3$ and $t_a=4t_L$. Since $T=jt_L=10t_L$, the 3 phases are divided among 10 lines. This can be done in a number of ways. One is to have phase I feed lines 1, 2, 3, and 4; phase II feed lines 5, 6, and 7; and phase III feed lines 8, 9 and 10. Another is to have phase I feed lines 1, 2, 3 and 4; phase II feed lines 5 and 6 and phase III feed lines 7, 8, 9 and 10. In the first case, phase II is delayed from phase I by at least 3/10×360°=108° but by not more than 4/10×360°=144° and phase III is delayed from phase I by at least 6/10×360=216° but by not more than 7/10×360°=252°. In the second case, phase II is delayed from phase I by at least 2/10×360°=72° but by not more than 4/10×360°=144° and phase III is delayed from phase I by 6/10×360°=216°.

What is claimed is:

1. In combination:

an array of electrical elements having $n$ rows and $m$ columns, where $n$ and $m$ are integers greater than 2, which it is desired to operate at a frame rate of $p$ frames per second, corresponding to a row period $t_L=1/pn$ seconds per row;

means for generating v alternating voltages, each having a period $T=jt_L=t_e+2_a$, an amplitude of zero volts during one interval $t_a \geq kt_L$ of each alternating voltage period, and varying in amplitude between its peak values during the remaining interval $t_e$ of each period, where $j$, $k$ and $v$ are integers, $j>k$, $v \geq j/k$, and said voltages are displaced in phase from one another 360°/$v$; and means for applying each alternating voltage to a different plurality of groups of rows, each group of rows comprising $k$ adjacent rows spaced from the next group of that plurality of groups by $k(v-1)$ adjacent rows.

2. A circuit as set forth in claim 1 wherein the means for generating alternating voltages comprise means for generating solely one cycle of an alternating voltage during each interval $t_e$.

3. A circuit as set forth in claim 1 wherein the said means for generating alternating voltages comprise means for generating more than one cycle of an alternating voltage during each interval $t_e$.

4. A circuit as set forth in claim 1 wherein said means for generating alternating voltages comprise means for generating a sinusoidal wave during each interval $t_e$.

5. A circuit as set forth in claim 1 wherein said means for generating alternating voltages comprise means for generating a square wave during each interval $t_e$.

6. A circuit as set forth in claim 1, wherein each element of said array comprises a transcharger controlled electroluminescent element; and further including element selection means for applying selection voltages to each element during the period that element has zero volts applied thereto by said means for generating said alternating voltages.

7. A circuit for exciting an array of electrical elements having $n$ rows and $m$ columns, where $n$ and $m$ are greater than 2, which it is desired to operate at a frame rate of $p$ frames per second, corresponding to a row period $t_L=1/pn$ seconds per row comprising:

means for generating a first alternating voltage having a period $T=jt_L=t_e+t_a$, having an amplitude of zero volts during one portion $t_a \geq kt_L$ of each alternating voltage period, and varying in amplitude between its peak values during the remaining interval $t_e$ of each period, where $j$ and $k$ are integers, and $j>k$;

means for generating a second alternating voltage of substantially the same shape as and 180° out-of-phase with said first alternating voltage;

means for applying said first alternating voltage to goups of $k$ adjacent rows of said array spaced from one another by $k$ rows; and means for applying said second alternating voltage to the remaining rows.

8. In combination:

an array of electrical elements having $n$ rows and $m$ columns, where $n$ and $m$ are integers greater than 2, which it is desired to operate at a frame rate of $p$ frames per second, corresponding to a row period $t_L=1/pn$ seconds per row;

means for generating $v$ alternating voltages each having a period $T=jt_L=t_a+t_e$, an amplitude of zero volts during one interval $t_a \geq kt_L$ of each alternating voltage period, and varying in amplitude between its peak values during the remaining interval $t_e$ of each period, where $j$, $k$ and $v$ are integers, $j>k$, $v \geq j/k$ and said voltages are displaced in phase from one another such that at any time in the interval T, at least one of said voltages has an amplitude of zero volts; and means for applying each alternating voltage to a different plurality of groups of rows, each group of rows comprising from one to $k$ rows.

References Cited

UNITED STATES PATENTS 3,011,157 11/1961 Anderson ---------- 340—173.2

JOHN W. HUCKERT, *Primary Examiner.*

J. D. CRAIG, *Assistant Examiner.*